(12) United States Patent
Abell et al.

(10) Patent No.: US 10,569,600 B2
(45) Date of Patent: Feb. 25, 2020

(54) ADHESIVE SYSTEMS FOR PREPARING COMPOSITES OF RUBBER AND POLAR THERMOSETS

(71) Applicant: Bridgestone Americas Tire Operations, LLC, Nashville, TN (US)

(72) Inventors: Joshua P. Abell, Franklin, TN (US); Ross W. Widenor, Munroe Falls, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 31 days.

(21) Appl. No.: 15/995,456

(22) Filed: Jun. 1, 2018

(65) Prior Publication Data

US 2018/0345726 A1   Dec. 6, 2018

Related U.S. Application Data

(60) Provisional application No. 62/514,395, filed on Jun. 2, 2017.

(51) Int. Cl.
*B60C 7/00* (2006.01)
*B29D 30/02* (2006.01)
(Continued)

(52) U.S. Cl.
CPC ............... *B60C 7/00* (2013.01); *B29D 30/02* (2013.01); *B29D 30/54* (2013.01); *B60C 7/10* (2013.01); *B60C 7/102* (2013.01); *C08G 18/69* (2013.01); *C09J 179/02* (2013.01); *C09J 179/08* (2013.01); *B29D 2030/544* (2013.01); *B29L 2030/006* (2013.01); *B32B 7/12* (2013.01); *B32B 25/08* (2013.01); *B32B 27/40* (2013.01); *B32B 2305/72* (2013.01); *C08G 2380/00* (2013.01); *C09J 2203/10* (2013.01)

(58) Field of Classification Search
CPC .... C09J 179/08; C09J 179/02; C09J 2203/10; C08G 18/69; C08G 2380/00; B60C 7/00; B60C 7/10; B60C 7/102; B29D 30/02; B29D 30/54; B29D 2030/544; B32B 27/40; B32B 25/08; B32B 7/12; B32B 2305/72; B29L 2030/006
USPC ........................................................ 152/151
See application file for complete search history.

(56) References Cited

U.S. PATENT DOCUMENTS 4,704,176 A   11/1987 Botzman
4,942,093 A   7/1990 Lawson
(Continued)

FOREIGN PATENT DOCUMENTS

CN   104159739 A   11/2014
CN   104768750 A   7/2015
(Continued)

*Primary Examiner* — Angela C Scott
(74) *Attorney, Agent, or Firm* — Meredith E. Hooker; Arthur Reginelli (57) ABSTRACT

An adhered composite includes (i) a polar thermoset substrate; (ii) optionally a primer layer disposed on the polar thermoset substrate; (iii) a first adhesive layer adhesively mated to the polar thermoset substrate, optionally with the primer layer disposed between the first adhesive layer and the polar thermoset substrate; (iv) a first layer of cured non-polar rubber adhesively mated to the first adhesive layer; (v) a second adhesive layer adhesively mated to the first layer of cured non-polar rubber; and (vi) a second layer of cured non-polar rubber forming an outer surface of the composite.

20 Claims, 2 Drawing Sheets

(51) Int. Cl.
*B29D 30/54* (2006.01)
*B60C 7/10* (2006.01)
*C08G 18/69* (2006.01)
*C09J 179/02* (2006.01)
*C09J 179/08* (2006.01)
*B29L 30/00* (2006.01)
*B32B 7/12* (2006.01)
*B32B 25/08* (2006.01)
*B32B 27/40* (2006.01)

(56) References Cited

U.S. PATENT DOCUMENTS

| | | | |
|---|---|---|---|
| 8,623,169 | B2 | 1/2014 | Delfino et al. |
| 9,751,364 | B2 | 9/2017 | Huyghe et al. |
| 2010/0112365 | A1 | 5/2010 | Obrecht et al. |
| 2014/0057091 | A1 | 2/2014 | Krawinkel et al. |
| 2015/0273953 | A1 | 10/2015 | Kotsubo et al. |

FOREIGN PATENT DOCUMENTS

| | | |
|---|---|---|
| DE | 102012212883 A1 | 5/2014 |
| WO | WO2008003411 A1 | 5/2010 |

ADHESIVE SYSTEMS FOR PREPARING COMPOSITES OF RUBBER AND POLAR THERMOSETS

CROSS REFERENCE TO RELATED APPLICATIONS

This application claims the benefit of U.S. Provisional Application Ser. No. 62/514,395 filed on Jun. 2, 2017, which is incorporated herein by reference.

FIELD OF THE INVENTION

Embodiments of the present invention are directed toward adhesive systems for bonding cured rubber elements to polar thermoset elements for the preparation of composites. The adhesive systems include a vulcanizable rubber tie layer, which may also be referred to as a gum cushion, that is at least indirectly mated to the respective cured rubber and polar thermoset elements through respective polyisocyanate bonding compositions.

BACKGROUND OF THE INVENTION

In the manufacture of non-pneumatic tires, there is often a need to bond non-polar components, such as cured diene-rubber components, to polar thermoset components, such as structural components formed from various polar thermoset materials. As the skilled person appreciates, the ability to bond polar elements to non-polar elements is frustrated by the surface tension that exists between these elements. Where the composites formed by bonding non-polar elements to polar elements undergo mechanical and dynamic stresses, the incompatibility between the elements can facilitate failure of the bond.

Attempts have been made to bond polar thermoset elements, such as polyurethane structural tire components, to non-polar tire elements, such as tire treads. For example, U.S. Pat. No. 4,942,093 proposes the use of a thermosetting adhesive composition including a bismaleimide compound and an isocyanate-terminated rubber to bond diene rubber to the polyurethane. The adhesive composition is applied to either the polyurethane substrate or an uncured rubber element (i.e. a non-polar element), and upon heating, the adhesive crosslinks with the uncured rubber while the uncured rubber is simultaneously crosslinked. It is suggested that the curing step occurs at temperatures of from 120 to 175° C. and pressures from 50 to about 10,000 psi.

U.S. Pat. No. 8,623,169 proposes that cured polyurethane can be adhered to uncured diene-based elastomer by using an adhesive system that includes a specific primer adhesive and a secondary adhesive layer. The adhesive primer composition includes a polyisocyanate compound and a vinyl ester or an unsaturated polyester resin. The secondary adhesive is compatible with the adhesive primer and may include phenolic-based glues or diene glues. The diene glues include a crosslinking agent, such as a polyester or vinyl ester resin, while the elastomer is preferably a polyvinylpyridine/styrene/butadiene elastomer. The composites are press cured, for example, at temperatures of 165° C. and 20 bar.

SUMMARY OF THE INVENTION

One or more embodiments of the present invention provide an adhered composite comprising (i) a polar thermoset substrate; (ii) optionally a primer layer disposed on said substrate; (iii) a first adhesive layer adhesively mated to said polar thermoset substrate, optionally with said primer layer disposed between said first adhesive layer and said polar thermoset substrate; (iv) a first layer of cured non-polar rubber adhesively mated to said first adhesive layer; (v) a second adhesive layer adhesively mated to said first layer of cured non-polar rubber; and (vi) a second layer of cured non-polar rubber forming an outer surface of said composite.

Yet other embodiments of the present invention provide a pre-cured composite comprising (i) a polar thermoset substrate; (ii) optionally a primer layer disposed on said polar thermoset substrate; (iii) a first adhesive layer disposed on said polar thermoset substrate or, where present, on said primer layer; (iv) a gum cushion disposed on said first adhesive layer; (v) a second adhesive layer disposed on said gum cushion opposite said first adhesive layer; and (vi) a cured non-polar rubber layer disposed on said second adhesive layer.

Still other embodiments of the present invention provide a non-pneumatic tire comprising (i) a polar thermoset substrate; (ii) optionally a primer layer disposed on said polar thermoset substrate; (iii) a first adhesive layer adhesively mated to said polar thermoset substrate, optionally with said primer layer disposed between said first adhesive layer and said polar thermoset substrate; (iv) a first layer of cured non-polar rubber adhesively mated to said first adhesive layer; (v) a second adhesive layer adhesively mated to said first layer of cured non-polar rubber; and (vi) a second layer of cured non-polar rubber forming an outer surface of said non-pneumatic tire.

DETAILED DESCRIPTION OF ILLUSTRATIVE EMBODIMENTS

Embodiments of the invention are based, at least in part, on adhesive systems for bonding cured non-polar rubber elements to polar thermoset elements. According to one or more embodiments, the adhesive system includes a vulcanizable rubber tie layer, which may also be referred to as a gum cushion, that is at least indirectly mated to the respective cured rubber and polar thermoset elements through respective polyisocyanate bonding compositions. A primer composition may be employed to enhance the bond between the polar thermoset element and a respective polyisocyanate bonding composition. A composite (including the uncured gum cushion) may then be heated to temperatures and pressures sufficient to vulcanize the gum cushion. While the prior art contemplates adhesive systems for bonding uncured rubber to polar substrates, the curing reactions contemplated by the prior art take place at severe conditions of temperature and pressure, which allow co-curing of the uncured rubber and the adhesive. It has been found that these severe conditions utilized in the prior art can have a deleterious impact on the polar thermoset element. The adhesive systems of the present invention advantageously create a technologically useful bond between the cured non-polar rubber and polar thermoset components while subjecting the pre-cured composite to curing conditions that are less severe on the polar thermoset components. Accordingly, by using the adhesive systems of the present invention, novel composites of cured, non-polar rubber and polar thermoset substrates can be prepared.

Pre-Cured Composite

Figure 1:
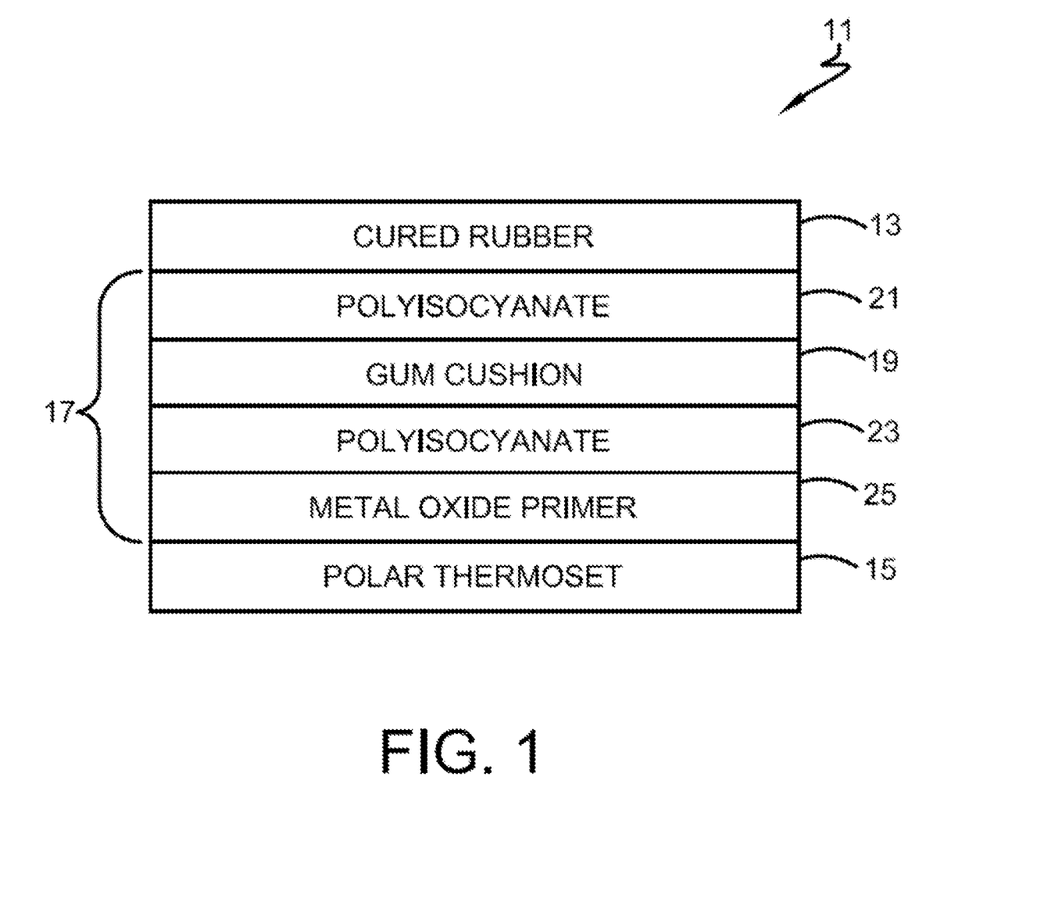
FIG. 1 is a cross-sectional schematic view of a composite including an adhesive system according to embodiments of the present invention.

Aspects of the invention can be described with reference to FIG. 1, which shows a pre-cured composite 11 including a cured non-polar rubber element 13 and a polar thermoset element 15. Cured non-polar rubber element 13 and polar thermoset element 15 are adhered to one another through an adhesive system 17. In one or more embodiments, adhesive system 17 includes a gum cushion layer 19, a first polyisocyanate adhesive layer 21, a second polyisocyanate adhesive layer 23, and an optional primer layer 25. As shown in FIG. 1, first polyisocyanate layer 21 is disposed between cured layer 13 and gum cushion 19. Second polyisocyanate layer 23 is disposed between gum cushion layer 19 and optional primer layer 25 when present or polar thermoset layer 15 when optional primer layer 25 is not present. When present, optional primer layer 25, which may also be referred to as a metal oxide primer layer 25, is disposed between polyisocyanate layer 23 and thermoset layer 15.

Cured Rubber Component

Embodiments of the present invention are not limited by the structural features of the cured non-polar rubber element 13, which may also be referred to as cured layer 13 or cured rubber component 13. In particular embodiments, cured non-polar rubber element 13 is a pre-cured tire tread. The skilled person appreciates that pre-cured tire treads generally have a planar configuration having a length generally corresponding to the circumference of a desired tire and a width generally corresponding to the width of the desired tire. Tire treads can be prepared by first preparing a green tread (i.e. uncured tread), which green tread may be fabricated by employing extrusion techniques or calendaring techniques, and then subjecting the green tread to curing conditions within a mold that typically dictates the overall shape and tread pattern of the cured tread. Pre-cured treads are often prepared in the art of tire retreading, and therefore U.S. Pat. Nos. 5,277,727, 6,758,931, 6,899,778, 7,052,568, 8,662,124, and 9,573,423 are incorporated herein in their entirety.

In one or more embodiments, the cured rubber component (e.g. procured tread) is a crosslinked, non-polar, polymeric network exhibiting elastomer properties. In one or more embodiments, the cured rubber component is a crosslinked network of a natural rubber, a synthetic elastomer, or a blend of a natural or synthetic elastomer. In particular embodiments, the cured rubber component includes a sulfur-crosslinked network of an elastomeric rubber such as a natural rubber and/or a synthetic elastomer. In one or more embodiments, the cured rubber component is a particulate-reinforced (e.g. filler reinforced) sulfur-crosslinked network of elastomeric rubber.

In one or more embodiments, the cured rubber component derives from curing or crosslinking a vulcanizable composition that includes a vulcanizable rubber, a filler, and a curative for the rubber.

In one or more embodiments, the vulcanizable rubber, which may also be referred to as a rubber or a vulcanizable elastomer, may include those polymers that can be vulcanized to form compositions possessing rubbery or elastomeric properties. These elastomers may include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures. These elastomers may also include one or more functional units, which typically include heteroatoms.

As suggested above, the vulcanizable compositions of the invention may include one or more fillers. These filler materials may include reinforcing and non-reinforcing fillers. Exemplary fillers include carbon black, silica, and sundry inorganic fillers.

Useful carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of greater than 20 $m^2/g$ and in other embodiments greater than 35 $m^2/g$; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

Examples of suitable silica fillers include precipitated amorphous silica, wet silica (hydrated silicic acid), dry silica (anhydrous silicic acid), fumed silica, calcium silicate, aluminum silicate, magnesium silicate, and the like.

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

Where one or more silicas is employed, the pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111; 3,873,489; 3,978,103; 3,997,581; 4,002,594; 5,580,919; 5,583,245; 5,663,396; 5,674,932; 5,684,171; 5,684,172; 5,696,197; 6,608,145; 6,667,362; 6,579,949; 6,590,017; 6,525,118; 6,342,552; and 6,683,135, which are incorporated herein by reference. Examples of sulfur-containing silica coupling agents include bis(trialkoxysilylorgano)polysulfides or mercapto-organoalkoxysilanes. Types of bis(trialkoxysilylorgano)polysulfides include bis(trialkoxysilylorgano)disulfide and bis(trialkoxysilylorgano)tetrasulfides.

Other useful filler materials include sundry inorganic and organic fillers. Examples of organic fillers include starch. Examples of inorganic fillers include silica, aluminum hydroxide, magnesium hydroxide, mica, talc (hydrated magnesium silicate), and clays (hydrated aluminum silicates).

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, (3rd Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, (2nd Ed. 1989), which are incorporated herein by reference. In one or more embodiments, the curative is sulfur. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Vulcanizing agents may be used alone or in combination. The skilled person will be able to readily select the amount of vulcanizing agents to achieve the level of desired cure.

In one or more embodiments, the curative is employed in combination with a cure accelerator. In one or more embodiments, accelerators are used to control the time and/or temperature required for vulcanization and to improve properties of the vulcanizate. Examples of accelerators include thiazol vulcanization accelerators, such as 2-mercaptobenzothiazol, dibenzothiazyl disulfide, N-cyclohexyl-2-benzothiazyl-sulfenamide (CBS), and the like, and guanidine vulcanization accelerators, such as diphenylguanidine (DPG) and the like. The skilled person will be able to readily select the amount of cure accelerators to achieve the level of desired cure.

Other ingredients that are typically employed in rubber compounding may also be added to the rubber compositions. These include accelerators, accelerator activators, oils, additional plasticizers, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

In one or more embodiments, a vulcanizable composition comprises a dihydrocarbyl succinate in combination with one or more processing oils. In one or more embodiments, a vulcanizable composition comprises a dihydrocarbyl succinate in combination with one or more additional ester-type plasticizers, such as octyl oleate. In one or more embodiments, a vulcanizable composition comprises one or more processing oils and one or more additional ester-type plasticizers. In one or more embodiments, a vulcanizable composition comprises a combination of two or more dihydrocarbyl succinates.

Where one or more processing oils, one or more additional ester-type plasticizers, an additional dihydrocarbyl succinate, or a combination thereof are used with a dihydrocarbyl succinate, the total combination of these components can be referred to as the total softeners in a vulcanizable composition. The total softeners can also include other low molecular weight additives.

In one or more embodiments, the vulcanizable compositions include at least 20, in other embodiments at least 30, and in other embodiments at least 40 percent by weight of the rubber component, based upon the entire weight of the composition. In these or other embodiments, the vulcanizable compositions include at most 90, in other embodiments at most 70, and in other embodiments at most 60 percent by weight of the rubber component based on the entire weight of the composition. In one or more embodiments, the vulcanizable compositions include from about 20 to about 90, in other embodiments from about 30 to about 70, and in other embodiments from about 40 to about 60 percent by weight of the rubber component based upon the entire weight of the composition.

In one or more embodiments, the vulcanizable compositions include at least 0, in other embodiments at least 10, and in other embodiments at least 20 parts by weight (pbw) of filler per 100 parts by weight rubber (phr). In these or other embodiments, the vulcanizable composition includes at most 200, in other embodiments at most 100, and in other embodiments at most 70 pbw of filler phr. In one or more embodiments, the vulcanizable composition includes from about 0 to about 200, in other embodiments from about 10 to about 100, and in other embodiments from about 20 to about 70 pbw of filler phr.

Polar Thermoset Component

Embodiments of the present invention are not limited by the structural features of polar thermoset element 15, which may also be referred to as polar thermoset layer 15, polar thermoset component 15, polar thermoset substrate 15, or substrate 15. In particular embodiments, polar thermoset component 15 is a structural component of a non-pneumatic tire including, but not limited to, a wheel or structural carcass. The skilled person appreciates that one or more structural components of a non-pneumatic tire may generally have a circular configuration (e.g. in the shape of a wheel, hoop or cylinder) that is defined by a circumference of a desired tire and a width generally corresponding to the width of the desired tire. In one or more embodiments, the polar thermoset component can be formed by casting techniques including those that are well known in the art. Structural components for non-pneumatic tires are generally known in the art, and therefore U.S. Pat. Nos. 4,350,196; 6,681,822; 8,720,504; 5,343,916; and 9,616,713 are incorporated herein in their entirety.

In one or more embodiments, polar thermoset component 15 includes a thermoset polymer matrix that may optionally include reinforcement including fiber or particulate reinforcement. In one or more embodiments, the thermoset polymer matrix is irreversibly chemically set into an infusible, insoluble polymer network. In one or more embodiments, the polar thermoset component is distinguished from the cured rubber component in that the polar thermoset component does not exhibit elastomeric properties. Also, in one or more embodiments, the polarity of the thermoset component is appreciably greater than any polarity associated with the cured rubber component.

In one or more embodiments, the polar thermoset component derives from curing or crosslinking a thermosetting composition that includes one or more thermosetting resins. Exemplary thermosetting resins include acrylic resins, polyester resins, vinyl ester resins, epoxy resins, polyurethane resins, phenolic resins, amino resins, and furan resins.

Gum Cushion

Embodiments of the present invention are not limited by the structural features of the gum cushion 19, which may also be referred to as cushion gum 19, cured non-polar rubber layer 19, or vulcanizable tie layer 19. The skilled person appreciates that cushion gum 19 will generally have a planar configuration having a length generally corresponding to the circumference of a desired tire or tire substrate and a width generally corresponding to the width of the desired tire and/or the width of the tire tread. Gum cushion 19 may be fabricated by employing extrusion techniques or calendaring techniques. As the skilled person appreciates, gum cushions are often employed in the art of tire retreading, and therefore U.S. Pat. Nos. 5,055,148; 5,151,148; 6,758,931; 7,052,568; 8,388,784; 9,539,778; and 9,573,423 are incorporated herein in their entirety.

In one or more embodiments, the cushion gum is a vulcanizable composition of matter having desirable tack and the potential for curing at relatively mild conditions of temperature and pressure (i.e. conditions less severe than would be need to cure a green tire). In certain embodiments, the cushion gum is formulated to be cured at conditions set forth herein for curing the pre-cured composite. The skilled person will be able to select curative and co-curatives, such as accelerants and the like, to tailor the curing performance of the gum cushion.

In one or more embodiments, the gum cushion is a vulcanizable composition of matter that includes a vulcanizable rubber, a filler, and a curative system. Additionally, other ingredients that are used in formulating rubber compositions may optionally be included. To the extent that gum cushion composition includes ingredients or constituents that are similar to those used in the manufacture of the non-polar cured rubber component, the description with respect thereto can be relied upon to formulate the gum cushion.

In one or more embodiments, the gum cushion is manufactured using a cure system that employs a low temperature curative such as, but not limited, a stable dinitrile oxide compound. In this respect, U.S. Patent Application No. 2012/0196976 and U.S. Pat. No. 6,355,826 are incorporated herein by reference.

In one or more embodiments, the rubber component of the cushion gum composition is a diene-based rubber. In these or other embodiments, the rubber component of the cushion gum composition includes synthetic polyisoprene or natural rubber. In these or other embodiments, the cushion gum composition contains at least about 50 wt. %; in other embodiments at least about 70 wt. %; and in yet other embodiments at least about 80 wt. % synthetic polyisoprene or natural rubber.

In one or more embodiments, the cushion gum composition may include from about 10 to about 120 parts by weight filler per 100 parts by weight rubber, in other embodiments from about 20 to about 100 parts by weight filler per 100 parts by weight rubber, and in other embodiments from about 30 to about 80 parts by weight filler per 100 parts by weight rubber.

As indicated above, the gum cushion may be in the form of a generally planar extrudate or calendared sheet. In one or more embodiments, this calendared sheet or extrudate may have a thickness of greater than 0.5 mm, in other embodiments greater than 1.0 mm, and in other embodiments greater than 1.5 mm. In these or other embodiments, this calendared sheet or extrudate may have a thickness of less than 8 mm, in other embodiments less than 6 mm, and in other embodiments less than 4 mm. In one or more embodiments, this calendared sheet or extrudate may have a thickness of from about 0.5 to about 10 mm, in other embodiments from about 1.0 to about 8 mm, and in other embodiments from about 1.5 to about 4 mm.

Polyisocyanate Adhesive Layer

In one or more embodiments, the polyisocyanate adhesive layers (e.g. adhesive layers 21 and 23) may derive from a solvent-borne reactive polyisocyanate composition. In one or more embodiments, the reactive polyisocyanate composition includes a polyisocyanate prepolymer, a chain extender, a solvent system, optionally a multifunctional isocyanate monomer, optionally a filler, optionally a catalyst, and optionally an isocyanate-reactive compound.

In one or more embodiments, the polyisocyanate prepolymer may include the reaction product of a polyisocyanate monomer and a polyisocyanate-reactive compound such as a polyol. In other embodiments, the prepolymer is the reaction product of polyisocyanate monomer with itself or with an amine. As the skilled person will appreciate, the prepolymer is synthesized by employing excess equivalents of isocyanate so as to produce a prepolymer having multiple reactive isocyanate functionalities. In one or more embodiments, the polyisocyanate prepolymers include polymers bearing two or more terminal isocyanate groups, such as polyesters, polyethers, or polycarbonates terminated with one or more isocyanate groups. In one or more embodiments, the prepolymer may be linear (i.e. with two isocyanate end groups), branched (i.e. with three or more isocyanate end groups), or a mixture thereof.

Useful polyisocyanate monomers, which may be used to prepare the prepolymers, or which may otherwise be used within the adhesive compositions, may include, but are not limited to, para-phenylene diisocyanate ("PPDI"), 2,4- and/or 2,6-toluene diisocyanate ("TDI"), 4,4'-methylene diphenyl diisocyanate ("MDI"), hexamethylene diisocyanate ("HDI"), 1,5-naphthalene diisocyanate ("NIDI"), trans-1,4-cyclohexane diisocyanate ("t-CHDI"), trimethyl xylylene diisocyanate ("TMXDI"), isophorone diisocyanate ("IPDI") and mixtures thereof.

Useful polyisocyanate-reactive compounds, which may be used to prepare the prepolymers, or which may otherwise be used within the adhesive compositions, include polyols. Useful polyols include, but are not limited to, polyester polyols, polyether polyols, polythioether polyols, polycarbonate polyols, and polycaprolactone polyols.

As the skilled person will appreciate, the chain extenders (which may also be referred to as curatives) that may be employed in the polyisocyanate adhesive compositions may be selected to provide adequate reaction time with the prepolymer and/or to give the desired urea linkages. In one or more embodiments, the chain extenders may include aliphatic amines, aromatic amines, and mixtures thereof. Exemplary aliphatic amines include, but are not limited to, ethylene diamine, 1,3-diaminopropane, 1,4-diaminobutane, hexamethylenediamine, aminoethanolamine, 1,4-diaminocyclohexane, isophorone diamine ("IPDA") and triethylenetetramine. Exemplary aromatic amines include, but are not limited to, 2,4-diaminotoluene, 2,6-diaminotoluene, 1,5-napthalenediamine, 1,4-phenylenediamine, 1,4-diaminobenzene, 4,4'-methylene bis(orthochloroaniline) ("MOCA"), 4,4'-methylenebisdianiline ("MDA"), 3,5-diethyl-2,4-diaminotoluene, diethyl toluene diamine ("DETDA"), trimethyleneglycol diaminobenzoate ("TMGDAB"), 4,4'-methylenebis(3-chloro-2,6-diethylaniline) ("MCDEA"), 4,4'-methylenebis(2,6-diethylanaline) ("MDEA"), and 3,3',5,5'-tetraisopropyl-4,4'-methylenebisaniline. In particular embodiments, the chain extenders include compact and symmetric aromatic diamines including those with no more than two phenyl rings and/or no longer than a three-carbon aliphatic group. In one or more embodiments, suitable primary diamine chain extenders include, but are not limited to, symmetric aromatic amines with molecular weights of from about 90 to about 500 g/mol, and mixtures thereof. Exemplary primary diamines include 1,4-phenylenediamine, 2,6-diaminotoluene, 1,5-naphthalenediamine, 4,4'-diaminodiphenyl methane, 3,3'-dimethyl-4,4'-diaminodiphenyl methane, 1-methyl-3,5-bis(methylthio)-2,6-diaminobenzene, 1-methyl-3,5-diethyl-2,6-diaminobenzene, 4,4'-methylene-bis-(3-chloro-2,6-diethylaniline) (MCDEA), 4,4'-methylene-bis-(ortho-chloroaniline), 4,4'-methylene-bis-(2,3-dichloroaniline), trimethylene glycol di-para-aminobenzoate, 4,4'-methylene-bis-(2,6-diethylaniline) (MDEA), 4,4'-methylene-bis-(2,6-diisopropylaniline), 4,4'-methylene-bis-(2-methyl-6-isopropylaniline), 4,4'-diamino diphenyl sulfone, and the like. In particular embodiments, the primary amine may be combined with a secondary diamine chain extender including those with molecular weights of from about 150 to about 500 g/mol. Examples include, but are not limited to, N,N'-di-sec-butyl-amino benzene and N,N'-di-sec-butyl-amino-diphenylmethane.

In one or more embodiments, it may be advantageous to block one or more of the reactive components of the polyisocyanate adhesive composition. This may include blocking the polyisocyanate prepolymer or the curative. As the skilled person appreciates, blocking (which may also be referred to as capping) includes attaching a blocking agent to a reactive group, such as an isocyanate end group, that can be controllably dissociated, such as by temperature control, to thereby allow the reactive group to be available for reaction. Where it is desired to block the isocyanate groups of the prepolymer, suitable blocking agents may include polyketimines, phenols, cyclic ketones, caprolactam, oximes, triazoles, certain alcohols, and beta-dicarbonyl compounds such as ethyl acetoacetate and ethyl malonate. Specific examples of suitable blocking agents include methyl ethyl ketoxime ("MEKO"), nonyl phenols (e.g., p-nonyl phenol), butyl phenols (e.g., p- or o-tert butyl phenol), dodecylphenols, propyl phenols, heptyl phenols, octyl phenols, cresols, trimethylphenols, xylenol, 3,5-dimethylpyrazole ("DMP"), diethylmalonate ("DEM"), epsilon-caprolactam ("epsilon-CAP" or simply "CAP"), 1,2,4-triazole, dimethyl-1,2,4-triazole, imidazole, diisopropylamine, acetoacetic ester, acetophenone oxime, acetone oxime, methyl ethyl ketoxime, cyclohexanone oxime, propyl aldehyde oxime, formaldoxime, butyl aldehyde oxime, cyclopentanone oxime, benzophenone oxime, and butanone oxime. Mixtures of blocking agents may be used. The equivalents ratio of isocyanate groups to blocking agents in the starting materials used to prepare the blocked polyurethane prepolymer may also be varied as desired. In certain embodiments, the NCO equivalents to blocking agent ratio may be within the range of from 1:1.01 to 1:1.20, preferably 1:1.03 to 1:1.10, or preferably about 1:1.05.

In one or more embodiments, suitable solvents or solvent systems include those solvents, or blends thereof, that dissolve or otherwise solvate the polyisocyanate prepolymer. Suitable solvents include, without limitation, tetrahydrofuran ("THF"), dimethyl sulfoxide, dimethyl formamide, N-methylpyrrolidone ("NMP"), toluene, xylene, benzene, ethyl benzene, acetone, methyl ethyl ketone, and methyl isobutyl ketone, as well as halocarbons such as, but not limited to, trichloroethylene, perchloroethylene, and trichloroethane.

Practice of the present invention is not limited by the type of filler that may be employed within the polyisocyanate adhesive composition. Exemplary fillers include carbon black and mineral fillers such as, but not limited to, calcium carbonate, clay, mica, talc, and various metal oxides such as titanium dioxide.

As suggested above, the polyisocyanate adhesive compositions may include one or more additional isocyanate-reactive compounds. In other embodiments, the adhesive composition may include water. In yet other embodiments, the adhesive composition may include one or more lactones such as, but not limited to, various oxides such as 1,2-butylene oxide.

As indicated above, the adhesive layer may be formed from a solvent-borne composition. In one or more embodiments, this solvent-borne composition may include greater than 10, in other embodiments greater than 15, and in other embodiments greater than 20 percent by weight solids. In these or other embodiments, this solvent-borne composition may include less than 40, in other embodiments less than 35, and in other embodiments less than 30 percent by weight solids. In one or more embodiments, solvent-borne adhesive composition may include from about 10 to about 40, in other embodiments from about 15 to about 35, and in other embodiments from about 20 to about 30 percent by weight solids.

In one or more embodiments, commercially available solvent-borne adhesive compositions may be employed to form adhesive layers 21 and 23. For example, the polyisocyanate-based adhesive available under the tradename Chemlok 233 Adhesive (LORD) can be employed.

Metal Oxide Primer Layer

In one or more embodiments, the primer layer (i.e. primer layer 25) may derive from a solvent-borne composition including one or more metal oxides dissolved or dispersed within a polar solvent. In particular embodiments, the primer composition may also include one or more non-polar solvents and a non-metallic filler.

In one or more embodiments, the metal oxides may include titanium dioxide, magnesium dioxide, zinc oxide, aluminum oxide, and mixtures of two or more thereof.

In one or more embodiments, useful polar solvents include ketones, aldehydes, and alcohols. Useful ketones include acetone, methyl ethyl ketone, ethyl isopropyl ketone, 2-hexanone, methyl isobutyl ketone, and methyl isopropyl ketone. Useful aldehydes include methanol, ethanol, propanol, and butanol. Useful alcohols include methanol, ethanol, propanol, butanol, ethylene glycol, propylene glycol, and butylene glycol, as well as modified derivatives thereof such as propylene glycol monoethyl ether.

As indicated above, the primer layer may be formed from a solvent-borne composition. In one or more embodiments, this solvent-borne composition may include greater than 10, in other embodiments greater than 15, and in other embodiments greater than 20 percent by weight solids. In these or other embodiments, this solvent-borne composition may include less than 40, in other embodiments less than 35, and in other embodiments less than 30 percent by weight solids. In one or more embodiments, solvent-borne primer composition may include from about 10 to about 40, in other embodiments from about 15 to about 35, and in other embodiments from about 20 to about 30 percent by weight solids.

In one or more embodiments, commercially available solvent-borne primer compositions may be employed to form primer layer 25. For example, the metal oxide primer available under the tradename Chemlok 205 Adhesive (LORD) can be employed.

Preparation of Composites

As indicated above, the adhesive system of the present invention can be employed to prepare composites where a non-polar cured rubber is adhered to a polar thermoset substrate. According to embodiments of the present invention, the composite can be prepared by first preparing the pre-cured composite. The pre-cured composite is then subjected to curing conditions to form the composite.

With reference to FIG. 1, pre-cured composite 11 can be prepared by first forming primer layer 25 onto a surface of polar thermoset substrate 15. The formation of primer layer 25 on substrate 15 can be accomplished by employing conventional techniques. As indicated above, primer layer 25 derives from a solvent-borne primer composition. Accordingly, the primer composition can be prepared at a desirable viscosity to allow application of the primer composition to substrate 15 by employing a variety of techniques including, but not limited to, brushing, knife coating, and/or spraying techniques. Application of the primer composition to substrate 15 may include application of the primer composition over the entire surface where bonding is desired or, in other embodiments, it may include a partial coating over the desired bonding surface.

In one or more embodiments, the primer composition is applied to provide a wet coating having a thickness of greater than 12 µm, in other embodiments greater than 24 µm, and in other embodiments greater than 36 µm. In these or other embodiments, the primer composition is applied to provide a wet coating thickness of less than 900 µm, in other embodiments less than 500 µm, and in other embodiments less than 100 µm. In one or more embodiments, the primer composition is applied to provide a wet coating thickness of from about 12 to 900 µm, in other embodiments from about 24 to 500 µm, and in other embodiments from about 36 to 100 µm.

Following formation of primer layer 25 on polar thermoset substrate 15, polyisocyanate adhesive layer 23 is formed on primer layer 25. Adhesive layer 23 may be formed immediately following formation of primer layer 25 or after a desired time interval. In one or more embodiments, adhesive layer 23 is formed on primer layer 25 following a time interval that allows at least partial evaporation of one or more solvents contained within the primer composition applied to form primer layer 25. In one or more embodiments, formation of adhesive layer 23 takes place after at least 1 minute, in other embodiments after at least 10 minutes, and in other embodiments after at least 20 minutes following application of the primer composition.

Where optional primer layer 25 is not present, polyisocyanate adhesive layer 23 is formed on substrate 15. Adhesive layer 23 may be formed immediately following formation of substrate 15 or after a desired time interval. In one or more embodiments, formation of adhesive layer 23 takes place after at least 1 minute, in other embodiments after at least 10 minutes, and in other embodiments after at least 20 minutes following formation of substrate 15.

As with primer layer 25, adhesive layer 23 derives from a solvent-borne adhesive composition. Accordingly, the adhesive composition can be prepared at a desired viscosity to allow application to primer layer 25 or substrate 15 by using various techniques including, but not limited to, brushing, knife coating, and/or spraying techniques. Application of the adhesive composition to primer layer 25 or substrate 15 may include application over the entire surface where bonding is desired or, in other embodiments, it may include a partial coating over the desired bonding surface.

In one or more embodiments, application of the adhesive composition provides a wet coating having a thickness of greater than 12 µm, in other embodiments at least 24 µm, and in other embodiments greater than 36 µm. In these or other embodiments, the adhesive composition is applied to provide a wet coating thickness of less than 900 µm, in other embodiments less than 500 µm, and in other embodiments less than 100 µm. In one or more embodiments, the adhesive composition is applied to provide a wet coating thickness of from about 12 to 900 µm, in other embodiments from about 24 to 500 µm, and in other embodiments from about 36 to 100 µm.

Following formation of adhesive layer 23, gum cushion 19 is applied to adhesive layer 23. Gum cushion layer 19 may be applied immediately following formation of adhesive layer 23 or after a desired time interval. In one or more embodiments, gum cushion 19 is applied to adhesive layer 23 following a time interval that allows at least partial evaporation of one or more solvents contained within the adhesive composition used to form adhesive layer 23. In one or more embodiments, gum cushion 19 is applied to adhesive layer 23 after at least 1 minute, in other embodiments after at least 10 minutes, and in other embodiments after at least 20 minutes following application of the adhesive composition that forms adhesive layer 23.

As indicated above, gum cushion 19 is formed from a solid-state polymeric calendared sheet or extrudate. The specifications and characteristics of this extrudate are also provided above. Practice of the present invention is not necessarily limited by the methods used to apply gum cushion 19 to adhesive layer 23. As those skilled in the art appreciate, gum cushion 19 can be applied to adhesive layer 23 using conventional means. In one embodiment, a roll of the gum cushion is rotatably mounted on a shaft and a layer of gum cushion 19 can be applied from this rotatably mounted roll. Where the thermoset substrate has a circular outer surface, and therefore primer layer 25 and adhesive layer 23 likewise have a circular outer surface, gum cushion 19 can be wrapped circumferentially around adhesive layer 23 using a tensioning roller. In so doing, tension may be used to stretch gum cushion 19 to facilitate adhesion to the adhesive layer 23, which is generally contoured according to substrate 15. In other embodiments, gum cushion 19 may be directly applied to adhesive layer 23 by employing extrusion techniques. In particular embodiments, gum cushion 19 may be stitched to force air from between adhesive layer 23 and gum cushion 19. In one or more embodiments, gum cushion 19 is removably mated to a transfer film (i.e. a release liner), prior to application to the composite and therefore application of gum cushion 19 to adhesive 23 may require removal of the release liner. Alternatively, where gum cushion 19 carries a release liner, removal of the release liner when positioned opposite adhesive layer 23, may be required prior to application of the subsequent adhesive layer 21 onto gum cushion 19, as will be described herein below.

Following application of gum cushion 19 to adhesive layer 23, polyisocyanate adhesive layer 21 is applied to gum cushion 19. Adhesive layer 21 may be formed immediately following application of gum cushion 19. In other embodiments, adhesive layer 21 may be formed following a time interval after application of gum cushion 19. In one or more embodiments, adhesive layer 21 is applied to gum cushion 19 after at least 1 minute, in other embodiments after at least 10 minutes, and in other embodiments after at least 20 minutes following application of gum cushion 19.

As with adhesive layer 23, adhesive layer 21 derives from a solvent-borne adhesive composition. Accordingly, the adhesive composition can be prepared at a desirable viscosity to allow application to gum cushion 19 by using a variety of techniques including, but not limited to, brushing, knife coating, and/or spraying techniques. Application of the adhesive composition to gum cushion 19 may include application over the entire surface of gum cushion 19 where bonding is desired or, in other embodiments, it may include a partial coating over the desired bonding surface.

In one or more embodiments, the adhesive composition is applied to provide a wet coating thickness greater than 12 μm, in other embodiments greater than 24 μm, and in other embodiments greater than 36 μm. In these or other embodiments, the adhesive composition is applied to provide a wet coating thickness of less than 900 μm, in other embodiments less than 500 μm, and in other embodiments less than 100 μm. In one or more embodiments, the adhesive composition is applied to provide a wet coating thickness of from about 12 to 900 μm, in other embodiments from about 24 to 500 μm, and in other embodiments from about 36 to 100 μm.

Following formation of adhesive layer 21, cured rubber component 13 is mated to adhesive layer 21. Cured rubber component 13 may be applied immediately following formation of adhesive layer 21 or after a desired time interval. In one or more embodiments, cured rubber component 13 is applied to adhesive layer 21 following a time interval that allows for at least the partial evaporation of one or more solvents from the adhesive composition used to form adhesive layer 21. In one or more embodiments, application of cured rubber component 13 takes place after at least 1 minute, in other embodiments after at least 10 minutes, and in other embodiments after at least 20 minutes following application of the adhesive composition to form adhesive layer 21.

Cured rubber component 13, which can be generally planar in configuration, includes opposed planar surfaces with a first planar surface being the contact surface, which may also be referred to as the bonding surface, where cured rubber component 13 is mated to polyisocyanate adhesive layer 21. In one or more embodiments, the bonding surface of cured rubber component 13 is treated prior to mating the cured rubber component to the adhesive layer. In one or more embodiments, the treatment may include one or more of mechanical treatment and chemical treatment. In particular embodiments, the mechanical treatment may include buffing or otherwise abrading the surface of the bonding layer to thereby increase the bonding surface or surface area thereof.

Cured rubber component 13 can be applied to adhesive layer 21 using a variety of techniques. As with the application of gum cushion 19, the application of cured rubber component 13 may require the removal of a release film or protective film that may be removably applied to cured rubber component 13. Also, cured rubber component 13 may be applied from a rotatably mounted feed roll together with a tensioning roller. As with gum cushion 19, where thermoset substrate 15 is circular in shape, cured rubber component 13 can be wrapped circumferentially around substrate 15 onto adhesive layer 21. Cured rubber component 13 may be guided by using one or more guide rollers.

Once cured rubber component 13 is applied to adhesive layer 21, which thereby forms pre-cured composite 11, pre-cured composite 11 is subjected to curing conditions. As indicated above, these curing conditions are relatively mild and therefore have less severe impact on polar thermoset substrate 15.

In one or more embodiments, the step of curing takes place by applying a desired or target amount of heat to the adhesive system while maintaining the substrate below certain threshold temperatures.

In one or more embodiments, the pre-cured composite is cured by bringing the temperature of the adhesive system, which for purposes of this specification is the actual temperature achieved by the gum cushion during the heating step, to temperatures of greater than 60° C., in other embodiments greater than 70° C., in other embodiments greater than 80° C., in other embodiments greater than 90° C., in other embodiments greater than 100° C., in other embodiments greater than 110° C., in other embodiments greater than 120° C., and in other embodiments greater than 130° C. In these or other embodiments, curing of the pre-cured composite takes place at temperatures where the gum cushion reaches temperatures less than 200° C., in other embodiments less than 180° C., and in other embodiments less than 150° C., in other embodiments less than 130° C., and in other embodiments less than 120° C. In one or more embodiments, curing of the pre-cured composite takes place by bringing the temperature of the adhesive system to temperatures of about 80 to 200° C., in other embodiments from about 90° C. to about 150° C., and in other embodiments from about 100° C. to about 130° C. In yet other embodiments, where an appropriate curative system is employed within the gum cushion, the step of curing takes place at ambient temperature.

In one or more embodiments, the pre-cured composite is cured by applying sufficient heat, as described above, while at the same time maintaining the temperature of the thermoset substrate (i.e. the polar thermoset substrate 15) below certain threshold temperatures. In one or more embodiments, the step of curing takes place while maintaining the temperature of the polar thermoset substrate at less than 200° C., in other embodiments less than 160° C., and in other embodiments less than 140° C., in other embodiments less than 120° C., in other embodiments less than 100° C., and in other embodiments less than 80° C. As the skilled person will appreciate, this can be accomplished by applying heat to the pre-cured composite externally; for example, heat is applied to the outer surface of the cured rubber component (e.g. cured tread) and thereby sufficient heat can be absorbed by the gum cushion prior to the heat migrating to the polar thermoset substrate.

In one or more embodiments, the pre-cured composite is cured while compressive forces are applied to the pre-cured composite that serve to compress the polar thermoset component to the cured rubber component with the adhesive system disposed therebetween. In one or more embodiments, the adhesive system, through the compressive forces applied to the polar thermoset component and/or the cured rubber component, experiences, at least during the curing step, compressive force of greater than 10 psi, in other embodiments greater than 15 psi, in other embodiments greater than 20 psi, and in other embodiments greater than 25 psi. In these or other embodiments, the adhesive system experiences, at least during the curing step, compressive force of less than 100 psi, in other embodiments less than less than 50 psi, and in other embodiments less than 30 psi. In these or other embodiments, the adhesive system experiences, at least during the curing step, compressive force of about 5 to 100 psi, in other embodiments from about 10 to about 50 psi, and in other embodiments from about 15 to about 30 psi.

In one or more embodiments, the pre-cured composite is cured in an environment that includes limited moisture. In particular embodiments, curing takes place in the presence of less than 80%, in other embodiments less than 60%, in other embodiments less than 40%, in other embodiments less than 30%, and in other embodiments less than 20% humidity.

INDUSTRIAL APPLICABILITY

Figure 2:
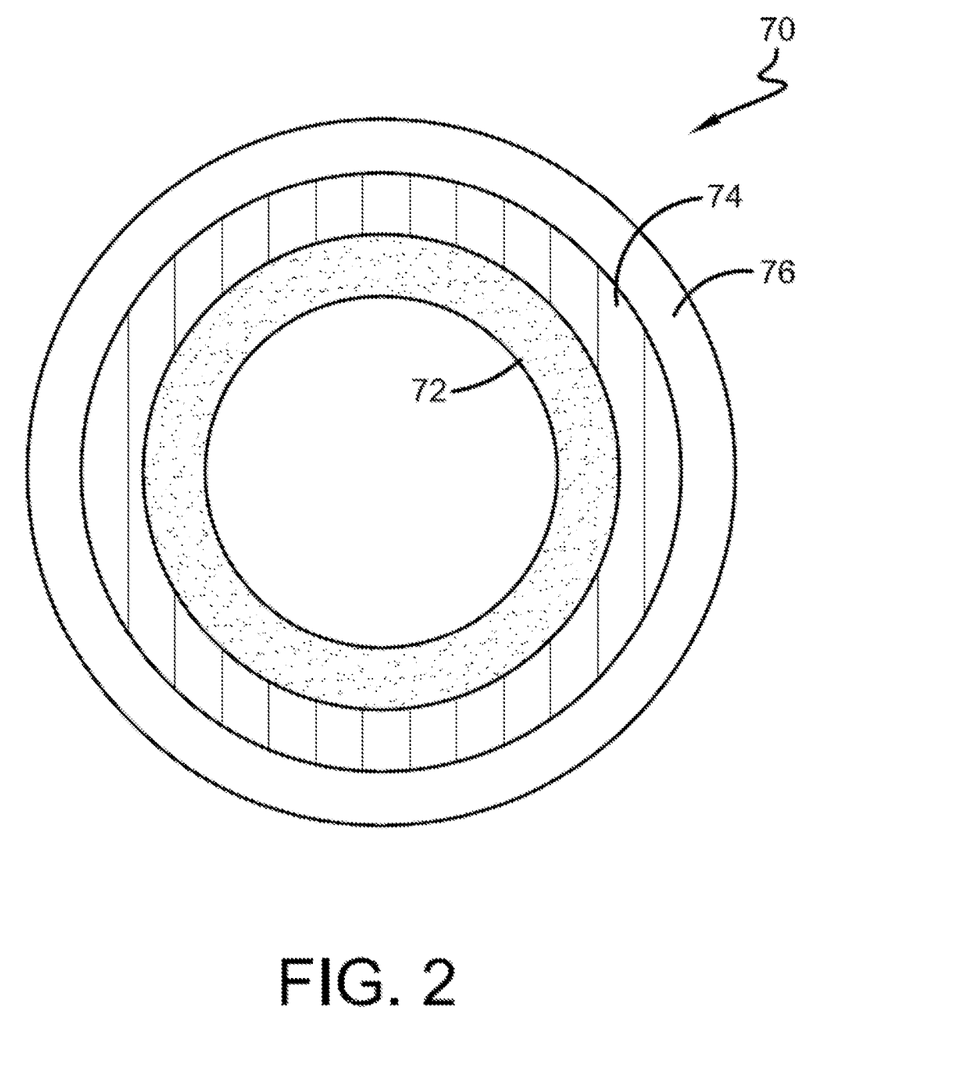
FIG. 2 is a cross-sectional schematic view of a non-pneumatic tire according to embodiments of the present invention.

As indicated above, the adhesive systems of the present invention advantageously provide a means for adhesively securing a non-polar cured rubber component to a polar thermoset substrate. The adhesive systems of this invention are therefore highly advantageous for preparing non-pneumatic tires. For example, FIG. 2 shows non-pneumatic tire 70 including polar thermoset substrate 72, which may be in the shape of an annulus or cylinder. As those skilled in the art appreciate, substrate 72 may form a structural component of non-pneumatic tire 72 that interfaces, either directly or indirectly, with a mechanical element of a motor vehicle, such as an axle. Adhesive system 74, which is consistent with the adhesive systems described herein above, is disposed on the outer circumferential surface of substrate 72, which is consistent with the thermoset substrates described herein above. A cured rubber tread 76, which is consistent with the cured rubber components described herein above, is adhesively mated to substrate 72 through adhesive system 74. Cured rubber tread 76 extends around the entire circumference of substrate 72.

Experimental

Various laboratory-scale sample pre-cured composites were prepared and tested. Specifically, various one-inch strips of polyurethane, having a thickness of a few millimeters, were provided and attempts were made to adhere the polyurethane strips to textile-reinforced cured-rubber sheets that were prepared using rubber formulations that included natural rubber and styrene-butadiene copolymer rubber. The various samples, which were all prepared in a similar manner, differed in the construction of the adhesive system as provided in the following Table. Where employed, the primer layer (primer) included a titanium dioxide primer obtained under the tradename Chemlok 205 (LORD) and was applied to the polyurethane substrate by brush coating a layer having a thickness under 100 microns. This primer layer was allowed to air dry at ambient conditions until it was visibly dry, and then, where applicable, a polyurethane adhesive (cement 1), obtained under the tradename Chemlok 233 (LORD) was applied to the primer layer by brush coating a layer having a thickness under 100 microns. This adhesive layer was allowed to air dry at ambient conditions until it was visibly dry, and then, where applicable, a strip of vulcanizable rubber, including natural rubber and butadiene rubber together with a sulfur-based cure system (cushion), was mated to the polyurethane adhesive layer. Then, where applicable, a polyurethane adhesive (cement 2), obtained under the tradename Chemlok 233 (LORD) was applied to the layer of vulcanizable rubber by brush coating a layer having a thickness under 100 microns. This polyurethane adhesive layer was allowed to dry under ambient conditions until visibly dry and then the textile-reinforced cured-rubber sheet was mated to the polyurethane adhesive layer (cement 2). Each sample was then shrink wrapped and placed into an oven, which was set at the temperatures and times listed in the Table. After curing, the samples were tested for adhesive properties using a peel test analogous to ASTM T-peel test D1876. The results of the testing are provided in the Table.

TABLE

| Sample | 1 | 2 | 3 | 4 | 5 | 6 | 7 | 8 | 9 | 10 |
|---|---|---|---|---|---|---|---|---|---|---|
| Primer | X | X | X | X | X | | | X | X | X |
| Cement 1 | X | X | X | X | X | X | | X | X | X |
| Cushion | | | | X | X | X | X | X | X | X |
| Cement 2 | X | X | X | X | X | X | X | | X | X |
| Cure Style | Oven, Shrink Wrap | Oven, Shrink Wrap | Oven, Shrink Wrap | Oven, Shrink Wrap | Oven, Shrink Wrap | Oven, Shrink Wrap | Oven, Shrink Wrap | Oven, Shrink Wrap | Oven, Shrink Wrap | Oven, Shrink Wrap |
| Pre-Cure Aging | | | | | RT Overnight | | | | | |
| Cure Temperature (° C.) | 105 | 105 | 105 | 105 | 105 | 105 | 105 | 105 | 105 | 145 |
| Cure Time (hr) | 2 | 5 | 8 | 4 | 4 | 4 | 4 | 4 | 8 | 4 |
| Average Peel Force (N) | 14.59 | 16.675 | 6.91 | 120.36 | 25.825 | 122.32 | 5.155 | 41.48 | 46.525 | 29.59 |

Based upon the foregoing results, it is apparent that inadequate adhesion was obtained in the absence of the gum cushion layer as shown in Samples 1-3, when compared to at least Samples 4, 6, and 9. Where the adhesive system did not include cement 1 (Sample 7), inferior adhesion was obtained compared to Sample 6. Where the adhesive system did not include cement 2 (Sample 8), inferior adhesion was obtained compared to Sample 4. Useful adhesion was obtained both with and without the primer, such as shown in Samples 4 and 6, although additional testing showed that greater consistency was obtained in the presence of the primer.

The results within the Table show two other significant findings. First, where the pre-cured composite was allowed to age overnight at room temperature prior to heat curing, inferior results were obtained. Also, where the curing took place at elevated temperatures (i.e. 145° C. in Sample 10), inferior results were obtained.

Various modifications and alterations that do not depart from the scope and spirit of this invention will become apparent to those skilled in the art. This invention is not to be duly limited to the illustrative embodiments set forth herein.

What is claimed is:

1. An adhered composite comprising:
  (i) a polar thermoset substrate;
  (ii) optionally a primer layer disposed on said substrate;
  (iii) a first adhesive layer adhesively mated to said polar thermoset substrate, optionally with said primer layer disposed between said first adhesive layer and said polar thermoset substrate;
  (iv) a first layer of cured non-polar rubber adhesively mated to said first adhesive layer;

(v) a second adhesive layer adhesively mated to said first layer of cured non-polar rubber; and (vi) a second layer of cured non-polar rubber forming an outer surface of said composite.

2. The composite of claim 1, where said polar thermoset substrate is a crosslinked network deriving from the crosslinking of a polymer composition including one or more of acrylic resins, polyester resins, vinyl ester resins, epoxy resins, polyurethane resins, phenolic resins, amino resins, and furan resins.

3. The composite of claim 1, where said primer layer is present and derives from a solvent-borne primer composition including a metal oxide.

4. The composite of claim 1, where said first adhesive layer derives from a solvent-borne composition including a polyisocyanate prepolymer.

5. The composite of claim 1, where said second adhesive layer derives from a solvent-borne composition including a polyisocyanate prepolymer.

6. The composite of claim 1, where said first layer of cured non-polar rubber derives from a vulcanizable rubber composition.

7. The composite of claim 1, where said second layer of cured non-polar rubber derives from a vulcanizable rubber composition.

8. The composite of claim 1, where said first adhesive layer is a crosslinked polyisocyanate.

9. The composite of claim 1, where said second adhesive layer is a cured polyisocyanate.

10. The composite of claim 1, where said first layer of cured non-polar rubber is a rubber vulcanizate.

11. A pre-cured composite comprising:
(i) a polar thermoset substrate;
(ii) optionally a primer layer disposed on said polar thermoset substrate;
(iii) a first adhesive layer disposed on said polar thermoset substrate or, where present, on said primer layer;
(iv) a gum cushion disposed on said first adhesive layer;
(v) a second adhesive layer disposed on said gum cushion opposite said first adhesive layer; and (vi) a cured non-polar rubber layer disposed on said second adhesive layer.

12. The composite of claim 11, where said polar thermoset substrate is a crosslinked network deriving from the crosslinking of a polymer composition including one or more of acrylic resins, polyester resins, vinyl ester resins, epoxy resins, polyurethane resins, phenolic resins, amino resins, and furan resins.

13. The composite of claim 11, where said primer layer is present and derives from a solvent-borne primer composition including a metal oxide.

14. The composite of claim 11, where said first adhesive layer derives from a solvent-borne composition including a polyisocyanate prepolymer.

15. The composite of claim 11, where said second adhesive layer derives from a solvent-borne composition including a polyisocyanate prepolymer.

16. The composite of claim 11, where said gum cushion derives from a vulcanizable rubber composition.

17. The composite of claim 16, where said gum cushion includes a diene rubber.

18. The composite of claim 17, where said gum cushion includes a sulfur-based cure system.

19. The composite of claim 11, where said cured non-polar rubber layer derives from a vulcanizable rubber composition.

20. A non-pneumatic tire comprising:
(i) a polar thermoset substrate;
(ii) optionally a primer layer disposed on said polar thermoset substrate;
(iii) a first adhesive layer adhesively mated to said polar thermoset substrate, optionally with said primer layer disposed between said first adhesive layer and said substrate;
(iv) a first layer of cured non-polar rubber adhesively mated to said first adhesive layer;
(v) a second adhesive layer adhesively mated to said first layer of cured non-polar rubber; and
(vi) a second layer of cured non-polar rubber forming an outer surface of said non-pneumatic tire.

* * * * *